US010394451B2

(12) United States Patent
Dudgeon et al.

(10) Patent No.: US 10,394,451 B2
(45) Date of Patent: *Aug. 27, 2019

(54) TEMPORARY SPILL AREA FOR VOLUME DEFRAGMENTATION (71) Applicant: International Business Machines Corporation, Armonk, NY (US)

(72) Inventors: Kyle B. Dudgeon, Vail, AZ (US); David C. Reed, Tucson, AZ (US); Esteban Rios, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/127,830

(22) Filed: Sep. 11, 2018

(65) Prior Publication Data

US 2019/0012086 A1 Jan. 10, 2019

Related U.S. Application Data (63) Continuation of application No. 14/737,426, filed on Jun. 11, 2015.

(51) Int. Cl.
*G06F 12/00* (2006.01)
*G06F 3/06* (2006.01)

(52) U.S. Cl.
CPC .......... *G06F 3/0604* (2013.01); *G06F 3/0644* (2013.01); *G06F 3/0647* (2013.01); *G06F 3/0683* (2013.01)

(58) Field of Classification Search
None
See application file for complete search history.

(56) References Cited

U.S. PATENT DOCUMENTS

| 5,574,907 A | 11/1996 | Jernigan, IV et al. |
| 6,584,551 B1 | 6/2003 | Huber |
| 7,567,995 B2 | 7/2009 | Maynard et al. |

(Continued)

OTHER PUBLICATIONS

Sears et al., "To BLOB or Not to BLOB: Large Object Storage in a Database or a Filesystem?" Microsoft Research, Technical Report MSR-TR-2006-45, Apr. 2006, pp. 1-11.

(Continued)

*Primary Examiner* — Reginald G Bragdon
*Assistant Examiner* — Michael L Westbrook
(74) *Attorney, Agent, or Firm* — Zilka-Kotab, P.C.

(57) ABSTRACT

A method according to one embodiment includes determining to temporarily extend an initial volume to be defragmented, identifying a plurality of additional volumes pooled with the initial volume within a storage group, identifying an area on each of the plurality of additional volumes pooled with the initial volume within the storage group to use for temporarily extending the initial volume, allocating the identified area on each of the plurality of additional volumes as a temporary extension of the initial volume, including, for each of the plurality of additional volumes, creating an entry in a VTOC of the additional volume that indicates that a non-VSAM data set resides at a location of the identified area on the additional volume, setting a plurality of pointers within a VTOC of the initial volume, where the plurality of pointers includes a pointer to the identified area on additional volumes, and defragmenting the initial volume.

20 Claims, 4 Drawing Sheets

(56) References Cited

U.S. PATENT DOCUMENTS

| | | |
|---|---|---|
| 7,584,341 B2 | 9/2009 | Gal-Oz |
| 8,037,239 B2 | 10/2011 | Furuhashi |
| 8,661,217 B2 | 2/2014 | Reed et al. |
| 8,819,375 B1 | 8/2014 | Pruett et al. |
| 8,909,891 B2 | 12/2014 | Reed et al. |
| 10,120,570 B2 | 11/2018 | Dudgeon et al. |
| 2003/0101383 A1 | 5/2003 | Carlson |
| 2005/0050294 A1 | 3/2005 | Horn et al. |
| 2009/0276588 A1 | 11/2009 | Murase |
| 2010/0293354 A1 | 11/2010 | Perez et al. |
| 2011/0072230 A1 | 3/2011 | Dudgeon et al. |
| 2012/0265934 A1 | 10/2012 | Gupta |
| 2012/0303918 A1 | 11/2012 | Reed et al. |
| 2016/0364166 A1 | 12/2016 | Dudgeon et al. |

OTHER PUBLICATIONS

Dudgeon et al., U.S. Appl. No. 14/737,426, filed Jun. 11, 2015.
Non-Final Office Action from U.S. Appl. No. 14/737,426, dated Aug. 25, 2016.
Final Office Action from U.S. Appl. No. 14/737,426, dated Apr. 13, 2017.
Advisory Action from U.S. Appl. No. 14/737,426, dated Jun. 22, 2017.
Non-Final Office Action from U.S. Appl. No. 14/737,426, dated Sep. 5, 2017.
Final Office Action from U.S. Appl. No. 14/737,426, dated Feb. 7, 2018.
Advisory Action from U.S. Appl. No. 14/737,426, dated May 11, 2018.
Notice of Allowance from U.S. Appl. No. 14/737,426, dated Jun. 28, 2018.
List of IBM Patents or Patent Applications Treated As Related.

TEMPORARY SPILL AREA FOR VOLUME DEFRAGMENTATION

BACKGROUND

The present invention relates to storage volume maintenance, and more specifically, this invention relates to more efficiently defragmenting a storage volume.

Currently, the defragmentation of a given a storage volume may require multiple passes of reads and writes over the volume. This multiple-pass logic moves tracks within the storage volume in an attempt to consolidate free space on the volume, and may also be used to consolidate extents within a data set.

The more full the storage volume is, the harder it is to defragment the volume. Additionally, it is typical to require more passes as the volume becomes increasingly full. In clustered, or other mirrored systems, these multiple pass defragmentation writes may be mirrored to remote sites, which results in an increase network traffic.

BRIEF SUMMARY

A computer-implemented method according to one embodiment includes determining to temporarily extend an initial volume to be defragmented by an amount no greater than a predetermined percentage of the initial volume, identifying a plurality of additional volumes pooled with the initial volume within a storage group, identifying an area on each of the plurality of additional volumes pooled with the initial volume within the storage group to use for temporarily extending the initial volume, allocating the identified area on each of the plurality of additional volumes as a temporary extension of the initial volume, including, for each of the plurality of additional volumes, creating an entry in a Volume Table Of Contents (VTOC) of the additional volume that indicates that a non-Virtual Storage Access Method (VSAM) data set resides at a location of the identified area on the additional volume, setting a plurality of pointers within a VTOC of the initial volume, where the plurality of pointers includes, for each of the plurality of additional volumes pooled with the initial volume within the storage group, a pointer to the identified area on the additional volume, and defragmenting the initial volume, utilizing the plurality of pointers within the VTOC of the initial volume and the identified area on each of the plurality of additional volumes.

According to another embodiment, a computer program product for creating a temporary extension of a volume includes a non-transitory computer readable storage medium that has program instructions embodied therewith, where the program instructions are executable by a processor to cause the processor to determine, by the processor, to temporarily extend an initial volume to be defragmented by an amount no greater than a predetermined percentage of the initial volume, identify, by the processor, a plurality of additional volumes pooled with the initial volume within a storage group, identify, by the processor, an area on each of the plurality of additional volumes pooled with the initial volume within the storage group to use for temporarily extending the initial volume, allocate, by the processor, the identified area on each of the plurality of additional volumes as a temporary extension of the initial volume, including, for each of the plurality of additional volumes, creating an entry in a Volume Table Of Contents (VTOC) of the additional volume that indicates that a non-Virtual Storage Access Method (VSAM) data set resides at a location of the identified area on the additional volume, set, by the processor, a plurality of pointers within a VTOC of the initial volume, where the plurality of pointers includes, for each of the plurality of additional volumes pooled with the initial volume within the storage group, a pointer to the identified area on the additional volume, and defragment, by the processor, the initial volume, utilizing the plurality of pointers within the VTOC of the initial volume and the identified area on each of the plurality of additional volumes.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for allocating a temporary spill area while performing a volume defragmentation.

In one general embodiment, a method includes analyzing a volume, and, based on the analysis, determining to temporarily extend the volume. The method further includes identifying at least one area on another volume to use for temporarily extending the volume, and allocating the at least one area on the other volume as a temporary extension of the volume.

In another general embodiment, a computer program product comprises a computer readable storage medium having program instructions embodied therewith. The program instructions are executable by a processor to cause the processor to analyze a volume, and, based on the analysis, determine to temporarily extend the volume. The program instructions are further executable by the processor to cause the processor to identify at least one area on another volume to use for temporarily extending the volume, and allocate the at least one area on the other volume as a temporary extension of the volume.

Figure 1:
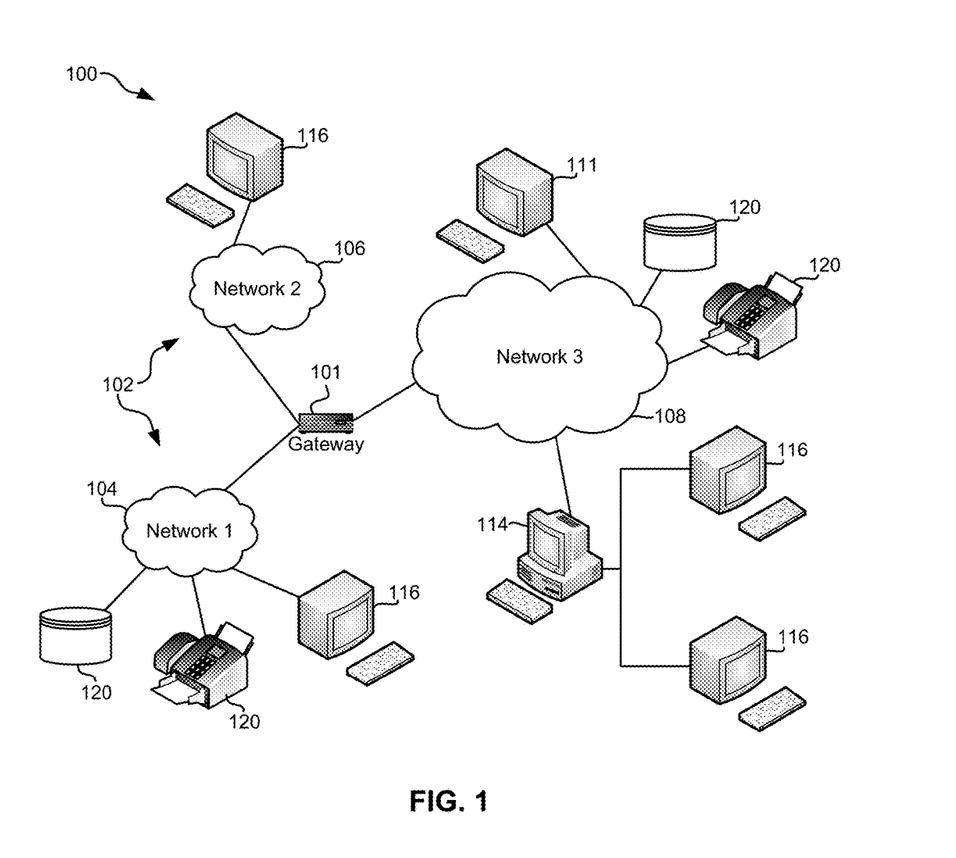
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
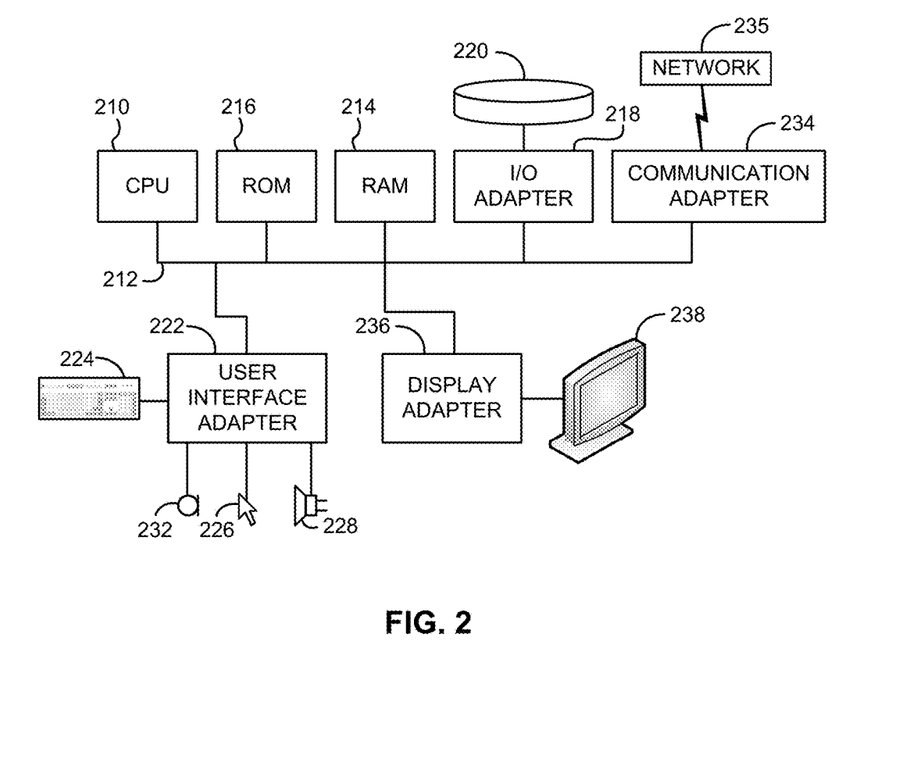
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
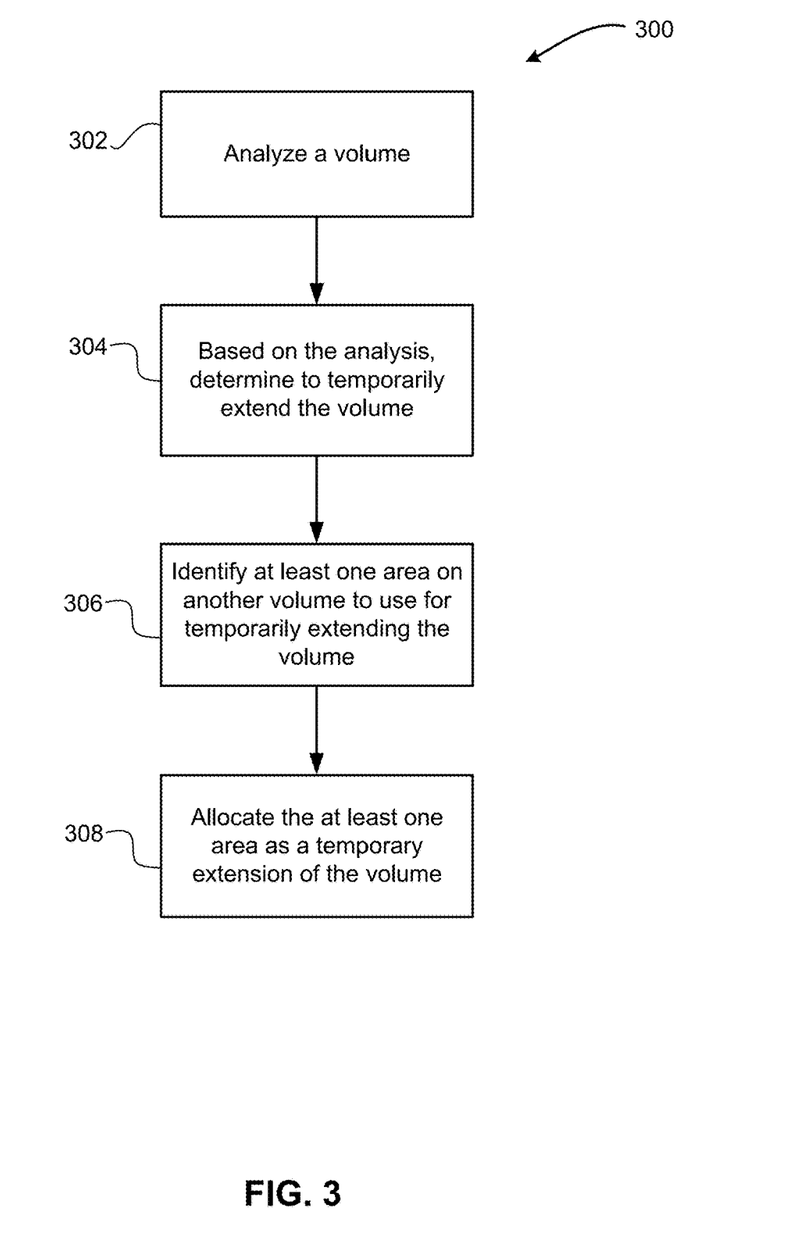
FIG. 3 illustrates a method for allocating a temporary volume extension for use in a defragmentation operation, in accordance with one embodiment.

Now referring to FIG. 3, a flowchart of a method 300 for allocating a temporary volume extension for use in a defragmentation operation is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a volume is analyzed. As used herein a volume includes any storage medium associated with a logical disk. Each volume may comprise a single accessible storage area with a file system. Further, the volume may include a logical volume, where the logical volume is composed of logical partitions that are allocated onto multiple physical partitions. Accordingly, the volume may reside on one or more hard disk drives, solid state drives, tapes, etc., and the volume may be composed a plurality of extents, where each extent may be associated with a contiguous range of addressable data units within the volume.

In one embodiment, analyzing the volume may include any operation that determines a fragmentation level of the volume. Using the determined fragmentation level of the volume, it may be possible to calculate or estimate a number of passes that it will take to defragment the volume.

Next, at operation 304, based on the analysis, it is determined to temporarily extend the volume. If the volume is extremely fragmented, or has little free space remaining, then it may require more passes of moving data from one location within the volume to another location in the volume in order to defragment the volume and consolidate extents. Free space may be used herein to reference any data storage area that is not currently allocated and/or used for the storage of data. In various embodiments, temporarily extending the volume may include any operation that results in the volume temporarily increasing in size or capacity.

In one embodiment, it may be determined to temporarily extend the volume any time it is determined that more than two passes will be required to defragment the volume.

Referring still to FIG. 3, at operation 306 at least one area on another volume is identified for use in temporarily extending the volume. In one embodiment, the at least one other area includes one or more portions of other volumes that are capable of being used for the storage of data, but are not currently being used.

In some embodiments, an amount of space used to create the temporary volume extension may be limited. In a particular embodiment, the amount of space used to create the temporary volume extension may depend on a total amount of free space available on other volumes. For example, the amount of space used to create the temporary volume extension may depend on a total amount of free space in a storage group of the volume. The storage group may comprise a plurality of volumes, including the volume that will be defragmented, that have been pooled.

Moreover, the amount of space used to create the temporary volume extension may further depend on a size of the volume being defragmented, and/or an amount of free space available on the volume being defragmented. For example, the amount of space used to create the temporary volume extension may be limited based on a total amount of free space in a storage group and an amount of free space available on the volume being defragmented.

In one embodiment, the amount of space used to create the temporary volume extension may be limited by threshold values. For example, a threshold may limit a percentage of free space in the storage group that can be used to extend the volume to not more than 5-35% (e.g., 5%, 10%, 15%, etc.) of the free space. In one particular embodiment, a threshold may limit a percentage of free space in the storage group that can be used to extend the volume to not more than 20% of the free space in the storage group.

Still yet, as yet another example, a threshold may limit the extension of the volume such that the most space that may be obtained for extending the volume may be limited to not more than 40-60% of the size of the volume being extended. In one particular embodiment, a threshold may limit a percentage of the volume such that the most space that may be obtained for extending the volume may be limited to not more than 50% of the size of the volume being extended. As another example, a threshold may limit the extension of the volume such that a combination of the free space of the volume and the temporary extension of the volume is not greater than 50% of the size of the volume being extended.

Accordingly, in one particular embodiment, thresholds may be established that together ensure that a percentage of free space in the storage group that can be used to extend the volume is not more than 20% of the free space, and the free space used for extending the volume is not greater than 50% of the size of the volume being extended.

In another embodiment, logic may try to ensure that 50% of a capacity of the volume is available for the defragmentation operation, where the available 50% is obtained using a combination of free space of the volume and all of the areas secured for extending the volume (e.g., non-contiguous areas, etc.), as long as no threshold or limitation for storage group free space is exceeded. In such an embodiment, if the storage group free space limit is reached, then the temporary extension of the volume may be set as large as possible without exceeding the storage group free space limit.

In some embodiments, the free space used to extend the volume may originate from a single other volume. In other embodiments, the free space used to extend the volume may originate from a plurality of other volumes (e.g., 2 volumes, 5 volumes, 10 volumes, 20 volumes, etc.)

Additionally, at operation 308, the at least one area is allocated as a temporary extension of the volume. The allocation of the at least one area may include any operation that renders the area available for storing data from the volume being defragmented. Further, allocating an area as a temporary extension of the volume may exclude applications, etc. from storing data to the area.

As a result of allocating the at least one area, these areas may be used as a temporary holding area for data that will be moved on the volume being defragmented. Use of these areas as a temporary holding area may free up additional space on the volume being defragmented, which may improve the overall efficiency of the defragmentation operation. Further, use of the temporary holding area may reduce an overall run time of the defragmentation operation, reduce a number of passes of the defragmentation operation, and a total I/O associated with the defragmentation operation. In systems where the volume is mirrored over a network, this may result in a reduction of network traffic that would otherwise arise out of the defragmentation of the volume.

In one embodiment, the free space comprising the temporary extension of the volume may be allocated as a temporary volume data set. For example, the temporary extension of the volume may be allocated, within a respective Volume Table Of Contents (VTOC) of each of the volumes that the free space originates from, as a non-Virtual Storage Access Method (VSAM) physical sequential data set. More specifically, within a VTOC of a given volume that at least a portion of the free space originates from, an entry may be created in the VTOC indicating a non-VSAM data set resides at a location of the free space. Such an entry or placeholder may be created in the VTOC of every donating volume. In this manner, the free space may appear as used (i.e., by a non-VSAM data set), and no other process will attempt to store data to the free space of the donating volume(s).

In another embodiment, the temporary extension of the volume may be mapped within a Volume Table Of Contents (VTOC) of the volume being defragmented. In other words, regions of storage media comprising the temporary volume extension may be mapped by an extension of a VTOC of the volume undergoing the defragmentation. The mapping may include setting pointers to the temporary extension of the volume. The temporary extension may include portions of one or more other volumes, and thus the pointers may be to the portions of the one or more other volumes. In other words, a VTOC of the volume being defragmented may point to areas of other disks that have been collectively allocated as a temporary extension of the volume. Any defragmentation operation that relies on the VTOC of the volume may see these areas as free space available on the volume being defragmented.

Accordingly, several data sets may be allocated on different volumes, depending on where the areas identified as free space exist, and the sizes of contiguous portions of the free space in these areas. After allocation, a hosting volume may view the at least one area allocated to the temporary extension of the volume as being owned by the temporary volume, and as being reserved for use by the temporary volume. In this manner, despite the pointers to the one or more other volumes, track locations are represented as additional free space for the volume being defragmented.

After allocating the at least one area as a temporary extension of the volume at operation 308, the volume may then be defragmented utilizing the temporary extension of the volume. As defragmentation logic analyzes where to move data on a pass (e.g., a first pass), it will use the extra space of the temporary extension as if it was a part of the volume being defragmented. Thus, data sets may be moved off of the volume being defragmented in a manner that opens up space to consolidate extents remaining on the volume. After the first pass, a second pass of the volume may be used to move the data from the temporary extension of the volume back to the original volume being defragmented.

Accordingly, in various embodiments, after the second pass, the volume may be completely defragmented. With all of the data moved back to the volume from the temporary extension of the volume, any data sets remaining on the temporary extension may be deleted. Further, any pointers inserted in the VTOC the defragmented volume may also be deleted, and the areas used to extend the volume may be returned to their respective hosting volumes.

In some scenarios, where a size of the temporary volume extension was limited in size and too small to allow complete defragmentation of the volume in two passes, the defragmentation operation may continue to run one or more passes and continue to use the temporary extension of the volume as if it is part of the volume. Regardless of the number of passes needed to defragment the volume, a final phase of the defragmentation operation may include moving any extents residing on the temporary extension of the volume back to the original volume.

Thus, in the manner described above, space may be temporarily allocated on a volume other than the volume being defragmented in a manner that allows the space to be used as an extension of the volume being defragmented. To a defragmentation operation/defragmentation logic, during a first pass of the volume, the space appears to be free space that is a part of the volume being defragmented. Accordingly, the defragmentation logic identifies the space as free space of the volume that is available for use by the defragmentation logic. In this manner, since the temporary volume extension may be used to temporarily hold data from the volume being defragmented, free space may be created on the volume actually being defragmented. This free space on the volume being defragmented may then allow for rapid assembly of contiguous extents, and, as long as sufficient free space may be allocated to the temporary extension, essentially ensures that the defragmentation operation requires no more than two passes of the volume.

In other words, a first pass may create free space on a volume by moving some data off the volume and to a temporary volume extension; and a second pass may move the data back to the volume, and into the free space created by the first pass, from the temporary volume extension. As noted above, this may depend on the amount of free space available in a storage group of the volume.

After the defragmentation of the volume has completed, the areas allocated as a temporary extension of the volume may be freed up for storage of data. Of course, the areas may be utilized as temporary volume extensions for subsequent defragmentation operations of other volumes.

Figure 4:
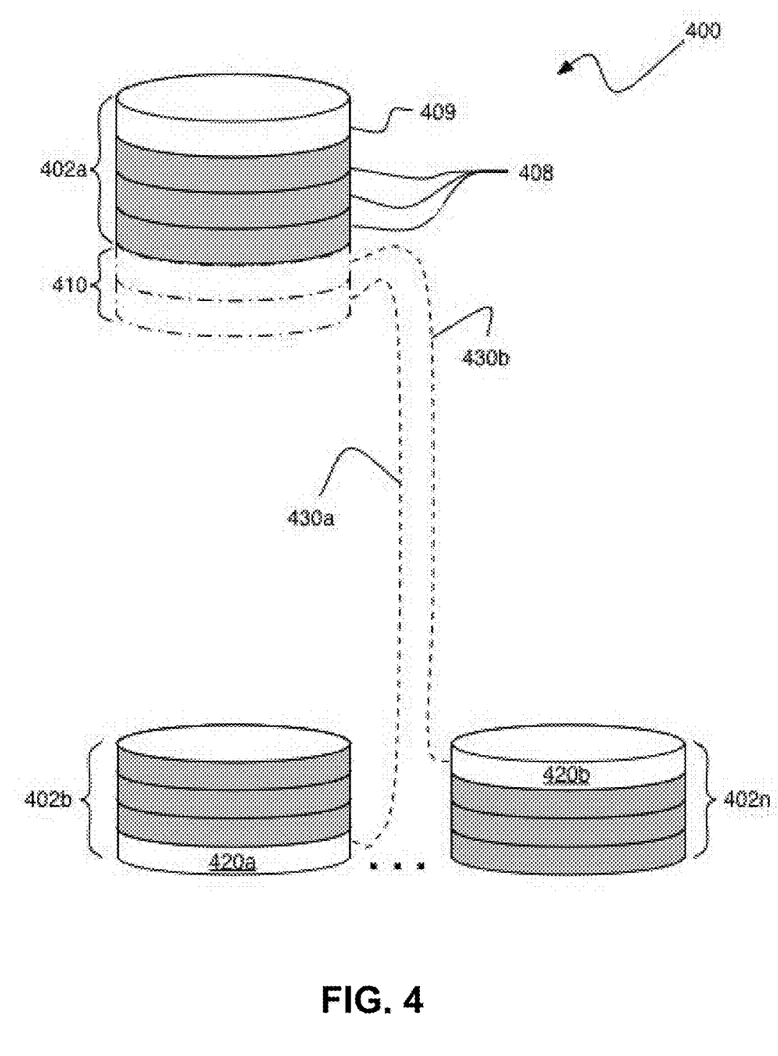
FIG. 4 illustrates a system utilizing a temporary spill area for volume defragmentation, in accordance with another embodiment.

FIG. 4 depicts a system 400 utilizing a temporary spill area for volume defragmentation, in accordance with one embodiment. As an option, the present system 400 may be implemented in conjunction with features from any other embodiment listed herein, such as those described with reference to the other FIGS. Of course, however, such system 400 and others presented herein may be used in various applications and/or in permutations which may or may not be specifically described in the illustrative embodiments listed herein. Further, the system 400 presented herein may be used in any desired environment.

As shown in FIG. 4, the system 400 includes a plurality of volumes 402. Specifically, the system 400 is shown to include a volume 402a, which will be the target of a defragmentation operation, and other volumes 402b . . . 402n. While the other volumes 402b . . . 402n are shown to include two volumes in FIG. 4, any number of volumes in addition to the volume 402a may be present in a given system. For example, in some systems, there may be one volume, three volumes, nine volumes, etc. in addition to the volume that will be defragmented. Further, in some embodiments, all of the volumes 402 may be members of a storage group.

Additionally, as shown in FIG. 4, the volume 402a is shown to be 75% utilized by data 408, and have 25% of its capacity free 409. Accordingly, an analysis of the volume 402a (occurring before any defragmentation logic begins defragmenting the volume 402a) may determine a fragmentation level of the volume 402a, and may determine that more than two passes will be required to defragment the volume 402a.

In response to a determination that more than two passes will be required to defragment the volume 402a, at least one area on another volume is identified for use in temporarily extending the volume 402a.

As shown in FIG. 4, area 420a on volume 402b and area 420b on volume 402n are identified for extending the volume 402a. In other words, the area 420a on volume 402b and the area 420b on the volume 402n together comprise a temporary volume extension 410 of the volume 402a.

In one embodiment, a threshold or target value may ensure that the temporary volume extension 410 of the volume 402a results in the volume 402a having an amount of free space equal to 50% of the capacity of the volume 402a. This may ensure that defragmentation logic will be able to defragment volume 402a in only two passes.

In another embodiment, a threshold may ensure the area 420a on the volume 402b and the area 420b on the volume 402n together comprise no greater than 20% of the total free space available on all other volumes 402b . . . 402n. This may ensure that adequate free space remains on the volumes for storage of user, application, system, etc. data.

Still yet, the temporary volume extension 410 is shown mapped to the area 420a on the volume 402b utilizing a pointer 430a, and mapped to the area 420b on the volume 402n utilizing a pointer 430b. Accordingly, a VTOC of the volume 402a may point, using the pointers 430a, 430b, to the areas 420 on the volumes 402b and 402n.

In this manner, defragmentation logic that performs a defragmentation of the volume 402a after the temporary volume extension 410 has been created will utilize the areas of the volumes 402b and 402n as a temporary spill area for the data of the volume 402a. This may ensure that the volume 402a is defragmented in two passes.

Of course, the logic described above may be implemented as a method on any device and/or system, or as a computer program product, according to various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer implemented method, comprising:
   determining to temporarily extend an initial volume to be defragmented by an amount no greater than a predetermined percentage of the initial volume;
   identifying a plurality of additional volumes pooled with the initial volume within a storage group;
   identifying an area on each of the plurality of additional volumes pooled with the initial volume within the storage group to use for temporarily extending the initial volume;
   allocating the identified area on each of the plurality of additional volumes as a temporary extension of the initial volume, including, for each of the plurality of additional volumes, creating an entry in a Volume Table Of Contents (VTOC) of the additional volume that indicates that a non-Virtual Storage Access Method (VSAM) data set resides at a location of the identified area on the additional volume;
   setting a plurality of pointers within a VTOC of the initial volume, where the plurality of pointers includes, for each of the plurality of additional volumes pooled with the initial volume within the storage group, a pointer to the identified area on the additional volume; and
   defragmenting the initial volume, utilizing the plurality of pointers within the VTOC of the initial volume and the identified area on each of the plurality of additional volumes.

2. The method of claim 1, wherein defragmenting the initial volume includes:
   moving a plurality of data sets off of the initial volume onto the temporary extension of the initial volume during a first pass of the defragmenting in order to open up space to consolidate extents remaining on the initial volume, and
   moving the plurality of data sets from the temporary extension of the initial volume back to the initial volume during a second pass of the defragmenting.

3. The method of claim 1, wherein analyzing the initial volume includes determining a fragmentation level of the initial volume.

4. The method of claim 1, further comprising:
   identifying a completion of the defragmenting of the initial volume; and
   utilizing the identified area on each of the plurality of additional volumes within the temporary extension of the initial volume for a subsequent defragmentation operation of a volume other than the initial volume.

5. The method of claim 1, where the defragmenting completes in two passes.

6. The method of claim 1, wherein:
   an amount of space of the temporary extension of the initial volume is limited to at most 20% of a free space of each of the plurality of additional volumes in order to ensure that a portion of the free space of each of the plurality of additional volumes is available for storage of user, application, and system data within each of the plurality of additional volumes; and
   the initial volume is temporarily extended by an amount that is at most 50% of a size of the initial volume.

7. The method of claim 1, wherein an amount of space of the temporary extension of the initial volume is limited to 5-35% of a free space of the storage group.

8. The method of claim 1, wherein the predetermined percentage is between 40-60% of a size of the initial volume.

9. The method of claim 1, wherein:
   a percentage of free space in the storage group that can be used to extend the initial volume is limited to not more than 20% of the free space of the storage group; and
   the temporary extension of the initial volume is limited such that the initial volume is extended by no more than 50% of a size of the initial volume.

10. The method of claim 1, wherein the temporary extension of the initial volume is allocated as a temporary volume data set.

11. The method of claim 1, wherein another area other than the identified area on each of the plurality of additional volumes stores user, application, and system data.

12. The method of claim 1, further comprising deleting the pointers in the VTOC to the area on each of the plurality of additional volumes to use for temporarily extending the initial volume.

13. A computer program product for creating a temporary extension of a volume, the computer program product comprising a non-transitory computer readable storage medium having program instructions embodied therewith, the program instructions executable by a processor to cause the processor to:
   determine, by the processor, to temporarily extend an initial volume to be defragmented by an amount no greater than a predetermined percentage of the initial volume;
   identify, by the processor, a plurality of additional volumes pooled with the initial volume within a storage group;
   identify, by the processor, an area on each of the plurality of additional volumes pooled with the initial volume within the storage group to use for temporarily extending the initial volume;
   allocate, by the processor, the identified area on each of the plurality of additional volumes as a temporary extension of the initial volume, including, for each of the plurality of additional volumes, creating an entry in a Volume Table Of Contents (VTOC) of the additional volume that indicates that a non-Virtual Storage Access Method (VSAM) data set resides at a location of the identified area on the additional volume;
set, by the processor, a plurality of pointers within a VTOC of the initial volume, where the plurality of pointers includes, for each of the plurality of additional volumes pooled with the initial volume within the storage group, a pointer to the identified area on the additional volume; and
defragment, by the processor, the initial volume, utilizing the plurality of pointers within the VTOC of the initial volume and the identified area on each of the plurality of additional volumes.

14. The computer program product of claim 13, wherein defragmenting the initial volume includes:
moving, by the processor, a plurality of data sets off of the initial volume onto the temporary extension of the initial volume during a first pass of the defragmenting in order to open up space to consolidate extents remaining on the initial volume, and
moving, by the processor, the plurality of data sets from the temporary extension of the initial volume back to the initial volume during a second pass of the defragmenting.

15. The computer program product of claim 13, wherein analyzing the initial volume includes determining, by the processor, a fragmentation level of the initial volume.

16. The computer program product of claim 13, further comprising:
identifying, by the processor, a completion of the defragmenting of the initial volume; and
utilizing, by the processor, the identified area on each of the plurality of additional volumes within the temporary extension of the initial volume for a subsequent defragmentation operation of a volume other than the initial volume.

17. The computer program product of claim 13, where the defragmenting completes in two passes.

18. The computer program product of claim 13, wherein:
an amount of space of the temporary extension of the initial volume is limited to at most 20% of a free space of each of the plurality of additional volumes in order to ensure that a portion of the free space of each of the plurality of additional volumes is available for storage of user, application, and system data within each of the plurality of additional volumes; and
the initial volume is temporarily extended by an amount that is at most 50% of a size of the initial volume.

19. The computer program product of claim 13, wherein an amount of space of the temporary extension of the initial volume is limited to 5-35% of a free space of the storage group.

20. The computer program product of claim 13, wherein the predetermined percentage is between 40-60% of a size of the initial volume.

* * * * *